(12) United States Patent
Walton

(10) Patent No.: US 6,220,352 B1
(45) Date of Patent: Apr. 24, 2001

(54) PROCEDURE TO MOBILIZE ASPHALTENE-BASED CRUDE WITH A MICELLE SOLVENT

(75) Inventor: William B. Walton, Cleburne, TX (US)

(73) Assignee: ETechMM, Dallas, TX (US)

( * ) Notice: Subject to any disclaimer, the term of this patent is extended or adjusted under 35 U.S.C. 154(b) by 0 days.

(21) Appl. No.: 09/157,427

(22) Filed: Sep. 21, 1998

(51) Int. Cl.⁷ .............................. E21B 43/22; E21B 37/06
(52) U.S. Cl. ..................... 166/263; 166/270.1; 166/304; 166/312
(58) Field of Search .................................. 166/263, 300, 166/304, 270.1, 312

(56) References Cited

U.S. PATENT DOCUMENTS

| | | | |
|---|---|---|---|
| 3,599,716 | * 8/1971 | Thompson | 166/270.1 |
| 3,653,440 | * 4/1972 | Reisberg | 166/270.1 |
| 3,998,743 | * 12/1976 | Maly et al. | 507/203 |
| 4,278,129 | 7/1981 | Walton | 166/270.1 |
| 4,393,935 | * 7/1983 | Walton | 166/270.1 |
| 4,541,483 | 9/1985 | Walton | 166/270.2 |
| 4,775,489 | * 10/1988 | Watkins et al. | 507/202 |
| 4,813,482 | 3/1989 | Walton | 166/267 |
| 4,863,618 | * 9/1989 | Falls | 507/277 |
| 4,886,609 | * 12/1989 | Walton | 507/238 |
| 5,038,864 | 8/1991 | Dunleavy et al. | 166/300 |
| 5,104,556 | * 4/1992 | Al-Yazdi | 507/264 |

OTHER PUBLICATIONS

DOE to fund eight EOR research projects, Jul. 1998 Oil and Gas Journal, pp. 41, 44.*

"Royalty Summit", Watching Government by Patrick Crow from Washington, D.C.; Oil and Gas Journal, Jul. 6, 1998.

* cited by examiner

Primary Examiner—David Bagnell
Assistant Examiner—Jennifer R. Dougherty
(74) Attorney, Agent, or Firm—F. Lindsey Scott

(57) ABSTRACT

A process for restoring the injectivity or productivity of a well penetrating a subterranean formation by injecting a micelle treating fluid into the subterranean formation via the well with the micelle treating fluid containing a 2% potassium chloride water solution and a mutual solvent containing alcohol, aromatic hydrocarbon and an alkyl or alkylaryl polyoxyalkylene phosphate ester surfactant, thereafter displacing the micelle treating fluid into the formation by injecting a gas into the well and contacting accumulated asphaltene precipitate and a low-gravity, high-viscosity, asphaltene-based crude in the subterranean formation with the micelle treating fluid to disperse the accumulation of asphaltene and to reduce the viscosity of the low-gravity, high-viscosity, asphaltene-based crude.

13 Claims, 2 Drawing Sheets

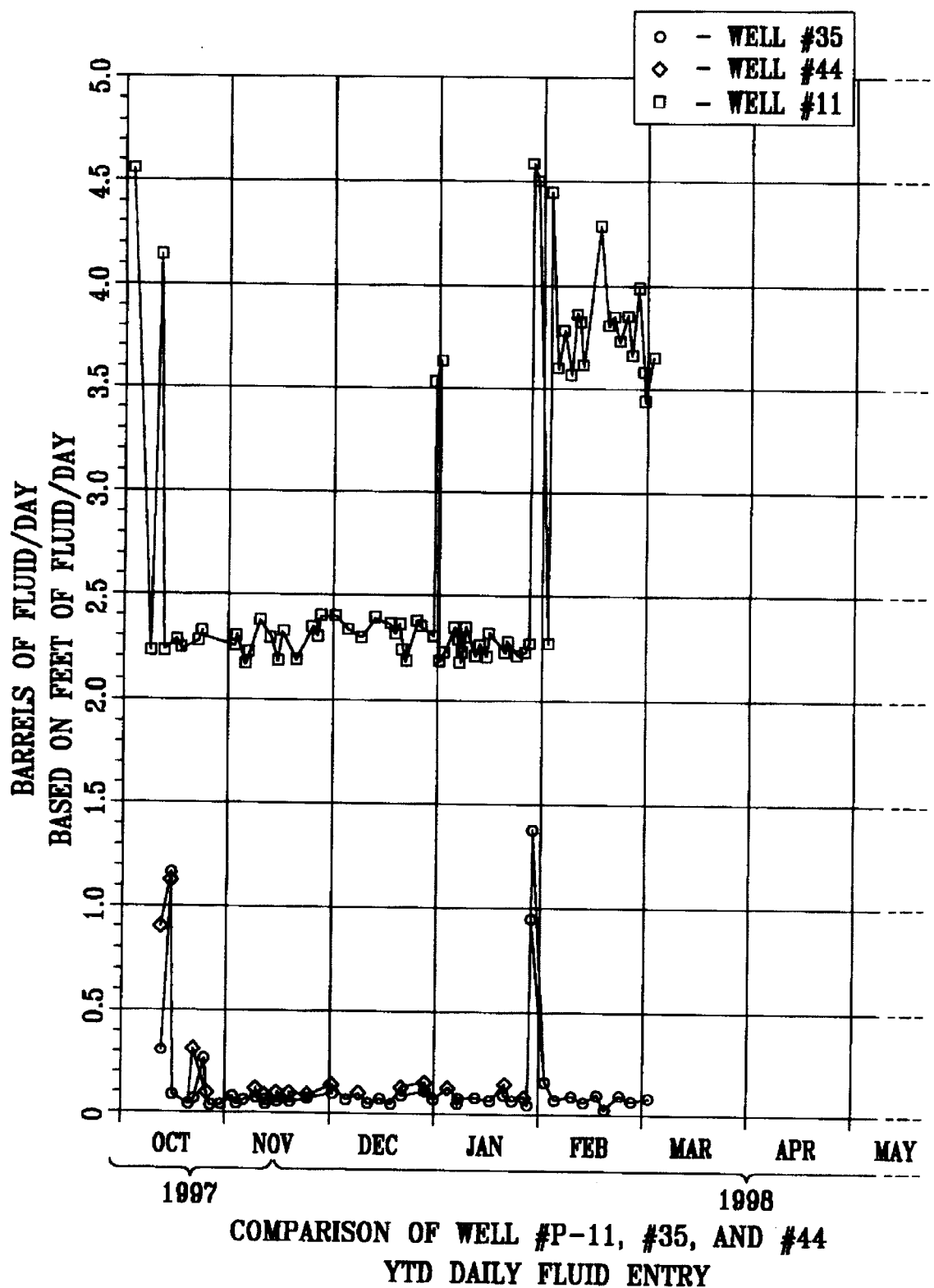

PROCEDURE TO MOBILIZE ASPHALTENE-BASED CRUDE WITH A MICELLE SOLVENT

FIELD OF THE INVENTION

This invention relates to a process for increasing the permeability of a subterranean formation that produces a low-gravity, viscous asphaltene-based crude and has no reservoir drive with gravity drainage as the only production mechanism and is partially plugged with asphaltene precipitate accumulation, by using a micelle treating fluid thereby restoring a well penetrating a subterranean formation.

BACKGROUND OF THE INVENTION

Hydrocarbons are conventionally produced from a subterranean hydrocarbon-bearing formation to the surface via a well penetrating and in fluid communication with the formation. Usually, a plurality of wells are drilled into fluid communication with a subterranean hydrocarbon-bearing formation to effectively produce hydrocarbons from a particular subterranean reservoir. Approximately 20 to 30 percent of the volume of the hydrocarbons originally present within a given reservoir in a subterranean formation can be produced by the natural pressure of the formation, that is, by primary production. In the case of reservoirs which produce a low-gravity, viscous asphaltene-based crude and have no reservoir drive, that is, water or gas, or a combination of both, it is estimated that less than 5 percent of the original oil in place is produced during a primary recovery.

Thereafter, additional quantities of hydrocarbons can be produced from most subterranean formations by means of secondary recovery processes such as water or steam flooding. To accomplish secondary recovery of the hydrocarbons present in the subterranean formation, one or more wells are converted to, or drilled as, injection wells. A drive fluid such as water or steam is injected into the subterranean formation via the injection wells to drive the hydrocarbons present to one or more wells that are designated as production wells. Hydrocarbons are produced to the surface from the designated production wells by conventional production equipment and practices.

A successful secondary recovery process may result in the recovery of about 30 to 50 percent of the original hydrocarbons in place in a subterranean formation. In the case of reservoirs that produce a viscous low gravity asphaltene-based crude and have no reservoir drive, such as, water, gas, or a combination of both. Water injection has little or no effect moving this viscous oil through the subterranean formation. With regards to steam injection, higher molecular weight asphaltenes will form and precipitate because of the removal of the light weight ends which act as naturally occurring asphaltene solvents. Another problem associated with steam contacting low gravity aspaltene-based crude is that asphaltene coking will occur and plug the formation.

Tertiary recovery processes have been developed to produce additional quantities of hydrocarbons from subterranean hydrocarbon-bearing formations. Such tertiary recovery processes include the addition of a surfactant and/or a polymer to a drive fluid, such as water. A surfactant reduces the interfacial tension between formation hydrocarbons and reservoir rock, whereas a polymer, such as a polyacrylamide or a polysaccharide, increases viscosity of the drive fluid to substantially reduce fingering or channeling of the drive fluid through the formation so as to produce a more uniform injection profile that results in increased hydrocarbon recovery. In the case of reservoirs which produce a viscous low gravity asphaltene-based crude and have no reservoir drive, such as, water, gas, or a combination of both, surfactant and/or polymer injection has little to no effect on moving this viscous oil through the subterranean formation. Surfactant injection has a tendency to cause emulsion blocks in the formation reducing fluid movement through the reservoir and polymers tend to increase the viscosity of the already viscous crude also reducing fluid movement through the reservoir. With the use of surfactants and/or polymers, the fluids produced to the surface have a tendency to be heavily emulsified, such that demulsification is expensive when there are high concentrations of the crude in the water phase.

Accordingly, a need exists for a process to restore the productivity of a production well in fluid communication with a subterranean formation, the permeability of a near well bore environment being reduced by asphaltene precipitate accumulation, low gravity, viscous asphaltene-based crude produced, and lack of a reservoir drive mechanism with only gravity drainage governing fluid migration through the formation that is inexpensive and effective.

Therefore, it is an object of the present invention to provide a process for restoring the productivity of a well penetrating a subterranean formation and having an asphaltene-based precipitate accumulation in the well bore by effectively increasing the permeability of a subterranean formation.

It is another object of the present invention to provide a process for the reduction of the viscosity of low gravity asphaltene-based crude, allowing for easier migration through the subterranean formation.

It is also an object of the present invention to provide a process to establish a drive mechanism within the subterranean formation allowing the asphaltene-based crude to be produced either from the well into which fluid and gas are injected or produced from wells offset to wells into which fluid and gas are injected.

Additionally, it is an object of this invention to provide a process for restoring productivity of a well in fluid communication with a subterranean formation which is effective and relatively inexpensive.

SUMMARY OF THE INVENTION

This invention is directed to a method for increasing production, or returning to production, oil wells having no reservoir drive and only gravity drainage as a production mechanism, and producing a heavy asphaltene-based crude. An increase in production or return to production is accomplished by treating a production well with a non-aqueous solution of an oxyalkylated phosphate ester surfactant, 2 percent potassium chloride water, and thereafter injecting a gas at a surface pressure of less than 200 PSIG to displace the resulting solution, a colloidal micelle solution, into the formation—a distance of 3 to 20 feet from the well bore. The resulting micelle solution containing the phosphate ester surfactant is allowed to remain in the formation for an effective period, generally for several hours, preferably for 24 hours to a week, after which the oil is recovered using a pump, tractor mounted swab unit, or alternatively using a conventional fluid drive mechanism whereby water and/or micelle treating fluid or air, or both, are injected into an offset injection well to displace the oil or gas. The micelle treating fluid comprises 2 percent potassium chloride water and a mutual solvent, which is mixed in a volumetric ratio of from about 1 to 1 to about 2 to 1 and injected via the well into contact with the accumulation of asphaltene precipitate and asphaltene-based crude. Air is injected at a surface pressure of less than 200 PSIG for a period of one hour and provides the drive mechanism for moving the micelle treating fluid out into the formation. It should be noted that normally exposure to air will cause asphaltene-based crude to cross link and precipitate, however, this does not occur in the presence of the micelle treating fluid. The mutual solvent comprises alcohol, aromatic hydrocarbon, and alkyl or alkylaryl polyoxyalkylene phosphate ester surfactant The treating fluid degrades and disperses the asphaltene precipitates as well as reduces the viscosity of the asphaltene-based crude.

BRIEF DESCRIPTION OF DRAWINGS

FIG. 2 graphically shows the test results described in Example 2.

DESCRIPTION OF THE PREFERRED EMBODIMENT

Figure 1:
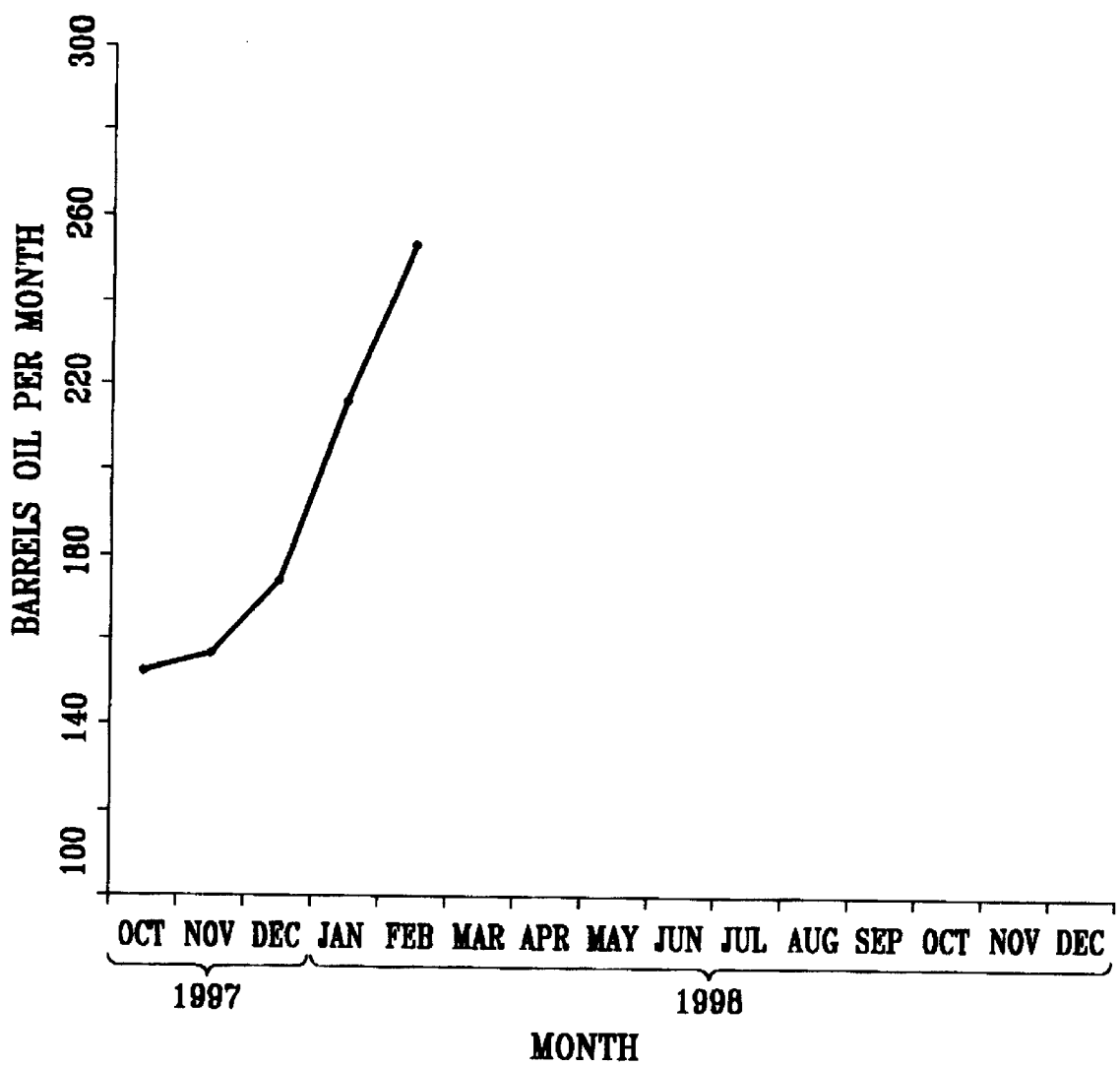
FIG. 1 graphically shows the production results of Example 1.

In accordance with the present invention, a process is provided for effectively restoring productivity of a well in fluid communication with a subterranean hydrocarbon-bearing formation having no reservoir drive mechanism, that produces a low gravity, viscous asphaltene-based crude and has accumulated asphaltene precipitates in the near well bore environment that reduces the permeability of the formation. The process of this invention comprises injecting into the formation, via the well, a micelle treating fluid containing 2 percent potassium chloride water and a mutual solvent comprising alcohol, aromatic hydrocarbon, and an alkyl or alkylaryl polyoxyalkylene phosphate ester surfactant that contacts the accumulated asphaltene precipitate and low gravity, viscous asphaltene-based crude. A gas, sometimes referred to herein as air, is injected for one hour at a surface pressure of less than 200 PSIG, after which the well is shut in for a period of time.

As utilized through this specification, the alkyl or alkylaryl polyoxyalkylene phosphate ester surfactant of the mutual solvent used in the treating fluid of this invention has the formulas detailed at line 5, column 3 through line 40 column 4 of U.S. Pat. No. 4,541,483 which is hereby incorporated by reference. Preferably the alkyl or alkylaryl polyoxyalkylene phosphate ester surfactant is present in the mutual solvent in an amount equal to from about 5 to 50 weight percent of the mutual solvent. More preferably, the surfactant is present in the mutual solvent in an amount equal to from 10 to 20 weight percent of the mutual solvent and desirably from about 12 to 18 weight percent of the mutual solvent.

In accordance with this invention, a volume of 2 percent potassium chloride water is mixed with a volume of solvent to form the micelle treating fluid. The ratio of the volume of 2 percent potassium chloride water to mutual solvent will vary depending upon the degree of asphaltene precipitation which is determined prior to the well stimulation. The ratio of 2 percent potassium chloride water to mutual solvent is preferably 1 to 1 to about 2 to 1.

The resultant micelle treating fluid is injected into a subterranean formation via a well whose productivity is reduced due to asphaltene precipitate in the well bore and/or in the subterranean formation and production of a low gravity-high viscosity asphaltene-based crude. The volume of micelle treating fluid injected is dependent on the size of the zone to be treated. Generally, a sufficient volume of micelle treating fluid is injected to contact substantially all of the aspaltene precipitate occupying the treatment zone, which is a function of the volume of the well bore itself, the pore volume, the oil saturation of the surrounding formation rock, and the void volume of any fracture network. As a general guide, the volume can range from about 1 gallon per foot of the depth of formation to be treated up to the economic limit as directed by the total cost of the micelle treating fluid. Preferably, the volume is from about 5 to about 7 gallons of micelle treating fluid per foot of formation interval to be treated. The micelle treating fluid is displaced into contact with the asphaltene precipitate and low gravity high viscosity aphaltene-based crude by injecting a volume of gas, such as, air, carbon dioxide, nitrogen, or natural gas either alone or augmented with the injection water and/or micelle treating fluid which is calculated to effect such displacement, as will be evident to the skilled artisan. The well is then shut in for a period of time, for example, 24 to 72 hours, which should be sufficient to permit the micelle treating fluid to remain in contact with the asphaltene precipitate accumulation and low gravity-high viscosity asphaltene-based crude. It is believed that the mutual solvent in the micelle treating fluid functions to attack, degrade, and disperse the high viscosity asphaltene-based crude. Thereafter, the wells are swabbed and put back in production using conventional production equipment or swabbed using a tractor mounted swabbing unit.

A preferred mutual solvent comprises an alkyl or alkylaryl polyoxyalkylene phosphate ester surfactant dissolved in a mixed non-aqueous solvent comprising methanol in an amount from about 20 to 27 percent isopropanol in an amount of from about 40 to 44 percent, capryl alcohol in an amount from about 8 to 12 percent, and xylene in an amount of from about 23 to 27 weight percent. The 2 percent potassium chloride water and the mutual solvent are mixed in a volumetric ratio of about 1 to 1 to about 2 to 1. The micelle treating fluid may be injected to contact only the accumulation of asphaltene precipitate in the near wellbore of the formation. The gas may be injected a second time after the well has been shut in for 24 hours. The well may then be shut in for an additional 24 hours. The micelle treating fluid may be moved out into the reservoir to contact the low-gravity, high-viscosity, asphaltene-based crude indigenous to the subterranean formation and thus reducing its viscosity. The resulting lower viscosity asphaltene-based crude dispersed in the micelle treating fluid is then caused to migrate back into a stimulated well or an offset well in fluid communication with the stimulated well by use of a gas, such as air, carbon dioxide, nitrogen, or mixtures thereof either injected alone or augmented with injection water and or micelle treating fluid.

Another method of recovery would be the injection of a gas, such as, air carbon dioxide, nitrogen, or natural gas either alone or with injection water injected via the well into the subterranean formation to effect the recovery of hydrocarbons from the formation. Treatment of an injection or production well bore in accordance with the process of the present invention may involve two or more sequential injections of the treating fluid and, a gas, such as, air, carbon dioxide, nitrogen, or natural gas either alone or augmented with injection water and/or micelle treating fluid.

It is believed that the mutual solvent in the micelle treating fluid substantially degrades and disperses the asphaltene precipitate breaking it into lower molecular weight units. Even though the degraded asphaltene precipitate is substantially the same species as the original precipitate because of its lower molecular weight, the degraded asphaltene precipitate is physically too small to accumulate and form a stable accumulation in the well bore or plug the formation pores. Thus, the lower molecular weight asphaltene precipitate has little permeability reducing effect. It is also believed that the mutual solvent in the micelle treating fluid substantially reduces the viscosity of the low gravity-high viscosity asphaltene-based crude present in the subterranean formation allowing it to easily migrate into the well itself or to a neighboring offset well in communication with the well stimulated. It is further believed that the 2 percent potassium chloride water not only acts as an agent to form the micelle treating fluid when mixed with the mutual solvent but also aids in altering the wettability of the formation rock changing it from being oil wet to being water wet. The injection of air serves as the drive mechanism. Because of the presence of the micelle treating fluid, it is believed that the air does not cause the asphaltene-based crude to oxidize and precipitate.

As used throughout this specification, the term "near well bore environment" denotes the area of subterranean formation, including rock matrix and fracture network surrounding a well bore penetrating the same which, as a general guide, extends a radial distance into the formation of up to 3.1 meters from the well bore. Further, as used throughout this specification, "asphaltene precipitate accumulation", "accumulation of asphaltene precipitate", or "accumulated asphaltene precipitate" is used interchangeably to denote a relatively high molecular weight asphaltene precipitate caused by the following: cross linking of the asphaltene by its reaction with acid; chloride nucleation and maltene stripping as water production increases; natural deposition which occurs in the production phase insitu as a result Brownian motion and shear diffusion, and asphaltene coking which can occur at elevated temperatures present in a well bore at the well bore face, or in a portion of a subterranean formation in a quantity sufficient to reduce the permeability of at least the portion of a subterranean formation so as to reduce the productivity or infectivity of fluid out of, or into, the subterranean formation via a well penetrating same. The asphaltene precipitate may contain scale, formation fines, or mixtures thereof.

The following example demonstrate the practice and utility of this invention, but are not to be construed as limiting the scope thereof

EXAMPLE 1

The Wardlaw Field situated in Edwards County, Tex. produces oil from the Glen Rose Formation, a dolomite, from a depth of 460 feet. This field has been in production for at least fifteen years and has always produced a thick, dark reddish/brown oil which is typical for the Glen Rose Formation as well as other formations situated in Edwards County, Tex. The Glen Rose Formation has no reservoir drive. Its oil and water production is governed only by gravity drainage. In the Wardlaw Field, 24 wells were initially stimulated using 2500–7,500 gallons of mud acid (12 percent HCL acid/3 percent HF acid), with the acid being flushed from the well bore into the near well bore using an average of 50 barrels of condensate.

On Oct. 13, 1997 eleven of the 24 producing wells were stimulated by using 30 gallons a micelle treating fluid comprised of a non-aqueous solution of an oxyalkylated phosphate ester mix, with 2 percent potassium chloride water. These eleven test wells were Wells # p-1, #p-4, #p-13, #24, #27, #29 #33, #35, #38, #39, and #44. The procedure consisted of swabbing each test well to draw down the Fluid column in the casing. This was followed by pumping 30 gallons of the non-aqueous solution of an oxyalkylated phosphate ester into each of the eleven test wells, over flushing with sufficient 2 percent potassium chloride water to bring the fluid level just over the upper perforations, forming the micelle treating fluid and injecting air at a surface pressure of less than 200 PSIG for 0.75 hours to displace the resulting micelle solution out of the well bore and into the nearby well bore area. The wells were then shut in for a period of 24 hours. After the 24 hour shut in period, air was once again injected into the eleven test wells at a surface pressure of less than 200 PSIG for a period of 0.75 hours after which the wells were shut in for an additional 24 hours period. The 2 percent potassium chloride water was used to form the micelle treating fluid with the non-aqueous solution of an oxyalkylated phosphate ester an d as well as a water source to alter the wettability of the formation from one of being oil wet to one of being water wet, thus allowing for an increase in oil flow from the near well bore area. It is a well documented fact that oil is more efficiently produced from a water wet formation than it is from an oil wet formation.

After the second 24 hour shut in period, the wells were vented to the atmosphere and casing swabbing was done utilizing a tractor mounted swab unit. The eleven test wells were swabbed twice on October 15, and twice on Oct. 16, 1997. The returned fluids produced by the swabbing were sampled and retained. The samples of the returned fluids were observed to contain a very heavy volume of solids, condensate-based micelles, asphaltene-based micelles, condensate interface, oil, and water. The appearance of the returned fluids for both October 15 and Oct. 16, 1997 were identical in properties. All samples showed the oil containing micelle treating fluid and emitted the distinctive odor of the micelle treating fluid. The wells continued to be swabbed throughout October, November, and December, 1997 as well as January 1998. The returned fluids from the eleven test wells were sampled each time the wells were swabbed. Through Nov. 12, 1997 these fluid samples continued to contain solids, condensate-based micelles, asphaltene-based micelles, condensate interface, asphaltene-based interface, oil, and water. It should be noted that the oil cut continued to increase from 45 percent observed on Oct. 15, 1997 to 90 percent observed on Nov. 12, 1997.

On Nov. 15, 1997 it was noted that ten of the eleven test wells began to produce a thin, dark reddish/brown oil instead of the typical thick, dark reddish/brown oil. The only well which was observed to be producing the typical thick, dark reddish/brown oil was well #27. This production of the thin, dark reddish/brown oil continued until Jan. 18, 1998 when five of the ten test wells reverted back to producing the typical thick, dark reddish/brown crude oil.

On Dec. 17, 1998 fluid samples from eight of the thirteen offset wells were sampled during the swabbing operation. These were Wells #p-3, #p-6, #p-7, #p-12, #22, and #23. Fluid from six of the wells exhibited the thin, dark reddish/brown oil which was observed in ten of the eleven test wells while the remaining two wells exhibited the typical thick, dark reddish/brown oil. The two wells which exhibited the typical thick,dark reddish/brown oil were Wells #p-7 and #p-8.

EXAMPLE 2

On Jan. 28, 1998 the eleven test wells were once again stimulated with the micelle treating fluid comprising a mixture of a non-aqueous solution of an oxyalkylated phosphate ester and 2 percent potassium chloride water. During this stimulation the eleven test wells, as well as the thirteen offset wells, were swabbed to draw down the fluid column in the casing. After swabbing, the eleven test wells were stimulated using 20 gallons of a non-aqueous solution of an oxyalkylated phosphate ester, again the 2 percent potassium chloride water was used to form the micelle treating fluid and to bring the fluid level just over the upper perforations, and air injected at a surface pressure of less than 200 PSIG for 0.75 hours. The eleven test wells were shut in for 24 hours. On Jan. 29, 1998 the thirteen offset wells were swabbed and air was injected into the eleven test wells at a pressure of less than 200 PSIG for a period of 0.75 hours. The procedure of swabbing the thirteen offset wells and air injection on the second day into the eleven test wells was initiated in an effort to move fluids from the eleven test wells to the thirteen offset wells. At 2:00 PM the afternoon of Jan. 29, 1998 the eleven test wells were vented to the atmosphere in the order in which they were stimulated on Jan. 28, 1998. At 3:30 PM, swabbing using the tractor mounted swab unit was initiated on the eleven test wells. Fluid samples were obtained during the swabbing operation and it was observed that these returned fluids contained a very heavy volume of solids, condensate-based micelle, asphaltene-based micelle, condensate-based interface, asphaltene-based interface, oil, water, oil containing micelle treating fluid, and the distinctive odor of the micelle treating fluid. Offset Wells #22, #23, and #p-11 were swabbed for a second time late the afternoon of Jan. 29, 1998. These three offset wells all exhibited the typical oil containing micelle treating fluid and the distinctive odor produced by the micelle treating fluid. Well #22 is offset by test Well #p-1, Well #23 is offset by test Well #24, and Well #p-11 is offset by test Wells #35 and #44. Thus from these results, a fluid drive was initiated using the swabbing of the offset wells and air injection into the test wells to impact the production of crude using the micelle treating fluid. Through February, 1998, ten of the test wells continued to produce the thin, dark reddish/brown oil while Well #27 continued to produce the typical thick, dark reddish/brown oil. As of Feb. 28, 1998 offset Wells #p-6, #p-11, #p-12, #22, #23, #30, #37, and #40 were all producing the thin, dark reddish/brown oil while offset Wells #p-3, #p-7 and #p-8 were producing the typical thick, dark reddish/brown oil. On Feb. 17, 1998 offset Well #30 began producing a very thin, dark reddish/brown oil which had the distinctive odor of the micelle treating fluid. It should be noted that Well #30 is offset by test Well #p-1. from November, 1997 through February, 1998 the gravity for this Wardlaw asphaltene-based crude has been observed to be 20.9 API.

Graph #1 (FIG. 1) shows the production results generated for the time frame of October, 1997 through February, 1998. Table #1 below exhibits the data used to generate Graph #1.

TABLE 1

| MONTH | MONTHLY PRODUCTION (BARRELS OF OIL) |
|---|---|
| OCTOBER, 1997 | 153.74 |
| NOVEMBER, 1997 | 157.97 |
| DECEMBER, 1997 | 174.08 |
| JANUARY, 1998 | 216.60 |
| FEBRUARY, 1998 | 253.73 |

As can be seen from Graph #1 and Table #1, production of the Wardlaw Field Estate Lease situated in Edwards County, Tex. for the month of February, 1998 was 65 percent greater than it was for the month of October, 1997. This increase resulted from the use of only 50 gallons of the non-aqueous solution of an oxyalkylated phosphate ester, 2 percent potassium chloride water, and only two 0.75 hour air injections, one on Jan. 28, 1998 and the second occurring on Jan. 29, 1998.

Graph #2 (FIG. 2) shows the impact that the test Wells #35 and #44 had on the offset Well # p-11. As can be seen from graph #2 the production for test Wells #35 and #44 track each other while the production for offset Well #p-11 shows a definite increase. Again, this movement of fluids from test Wells #35 and #44 to offset Well #p-11 was accomplished by using only 50 gallons of the non-aqueous solution of an oxyalkylated phosphate ester, 2 percent potassium chloride water, and only two 0.75 hour air injections, one on Jan. 28, 1998 and the second occurring on Jan. 29, 1998.

The treatment of the eleven test wells situated in the Wardlaw Field Estate Lease with the non-aqueous solution of an oxyalkylated phosphate ester surfactant, 2 percent potassium chloride water, and an air injection according to the practice of this invention is thus clearly effective in removing previous formation damage, reducing the viscosity of the produced oil, and improving permeability of the well formations.

It will be recognized by those skilled in the art that the examples above are provided by way of illustration and that many variations are possible without departing from the spirit and scope of the invention.

I claim:

1. A process for restoring the injectivity or productivity of a well penetrating a subterranean formation and defining a well bore and a well bore face, the injectivity or productivity of the well being reduced by an accumulation of an asphaltene precipitate on the well bore face or in the subterranean formation the process comprising:

a) injecting a micelle treating fluid into the well penetrating the subterranean formation, the micelle treating fluid comprising a 2 percent potassium chloride water solution and a mutual solvent comprising alcohol, aromatic hydrocarbon, and an alkyl or alkylaryl polyoxyalkylene phosphate ester surfactant, the 2 percent potassium chloride water solution and the mutual solvent being mixed in a volumetric ratio of about 1 to 1 to about 2 to 1, b) displacing the micelle treating fluid into contact with the accumulation of asphaltene precipitate and the low-gravity, high-viscosity, asphaltene-based crude in the formation by injecting a gas into the well; and, c) contacting the accumulation of asphaltene precipitate and the low-gravity, high-viscosity, asphaltene-based crude indigenous to the formation with the micelle treating fluid so that the micelle treating fluid degrades and disperses the accumulation of asphaltene precipitate to substantially restore infectivity or productivity of the well and reduces the viscosity of low-gravity, high-viscosity, asphaltene-based crude.

2. The process of claim 1 wherein the gas is selected from the group consisting of air, carbon dioxide, nitrogen and natural gas.

3. The process of claim 1 wherein at least a portion of the micelle treating fluid is injected with the gas.

4. The process of claim 1 further comprising shutting in the well for a period of time sufficient to allow the micelle treating fluid to degrade and disperse the accumulation of asphaltene precipitate, thereby substantially restoring injectivity or productivity of the well.

5. The process of claim 4 wherein the well is shut in for a period of 24 to 72 hours.

6. The process of claim 1 wherein the alkyl or alkylaryl poloxyalkylene phosphate ester is present in the mutual solvent in the amount from about 5 to 50 weight percent of the mutual solvent.

7. The process of claim 6 wherein the alkyl or alkylaryl poloxyalklene phosphate ester surfactant is present in the mutual solvent in an amount from 10 to 20 weight percent of the mutual solvent.

8. The process of claim 7 wherein the alkyl or alkyl poloxyalkylene phosphate ester surfactant is present in the mutual solvent in an amount from about 12 to 18 weight percent of the mutual solvent.

9. The process of claim 1 further comprising injecting the gas, either alone or augmented with injection water or micelle treating fluid a second time after the well has been shut in for 24 hours after a first gas injection.

10. The process of claim 9 wherein the well is shut in for an additional 24 hours.

11. The process of claim 9 wherein the micelle treating fluid is moved out into the reservoir contacting the low-gravity, high-viscosity, asphaltene-based crude indigenous to the subterranean formation, thus reducing its viscosity to produce a lower viscosity asphaltene-based crude dispersed in the micelle treating fluid.

12. The process of claim 9 wherein the lower viscosity asphaltene-based crude dispersed in the micelle treating fluid is caused to migrate back into the well.

13. The process of claim 12 wherein the lower viscosity asphaltene-based crude dispersed in the micelle treating fluid is caused to migrate to an offset well in fluid communication with the stimulated well by use of the gas, either injected alone or augmented with injection water or micelle treating fluid.

* * * * *